(12) United States Patent
Slinger et al.

(10) Patent No.: US 10,963,310 B2
(45) Date of Patent: Mar. 30, 2021

(54) INTELLIGENT CONTENTIONLESS PROCESSING RESOURCE REDUCTION IN A MULTIPROCESSING SYSTEM

(71) Applicant: International Business Machines Corporation, Armonk, NY (US)

(72) Inventors: Nigel G. Slinger, Los Gatos, CA (US); Matt Helliwell, Los Gatos, CA (US); Wen Jie Zhu, Chao Yang district (CN)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 16/039,540

(22) Filed: Jul. 19, 2018

(65) Prior Publication Data
US 2020/0026561 A1    Jan. 23, 2020

(51) Int. Cl.
*G06F 9/50* (2006.01)
*G06F 9/48* (2006.01)
*G06F 9/46* (2006.01)
*H04L 29/08* (2006.01)

(52) U.S. Cl.
CPC ............... *G06F 9/505* (2013.01); *G06F 9/46* (2013.01); *G06F 9/461* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4881* (2013.01); *G06F 9/50* (2013.01); *G06F 9/5005* (2013.01); *G06F 9/5022* (2013.01); *G06F 9/5027* (2013.01); *G06F 9/5061* (2013.01);
(Continued)

(58) Field of Classification Search
CPC .. G06F 9/455; G06F 9/45533; G06F 9/45558; G06F 2009/4557; G06F 2009/45575; G06F 9/48; G06F 9/4806; G06F 9/4843; G06F 9/485; G06F 9/4881; G06F 9/50; G06F 9/5005; G06F 9/5022; G06F 9/5027; G06F 9/505; G06F 9/5083; G06F 9/46; G06F 6/461; G06F 9/4856; G06F 9/461; G06F 9/5061; G06F 9/5077; G06F 9/5088; H04L 67/00; H04L 67/10
See application file for complete search history.

(56) References Cited

U.S. PATENT DOCUMENTS 8,473,960 B2    6/2013   Chambliss et al.
8,516,126 B2    8/2013   Gao et al.
(Continued)

OTHER PUBLICATIONS

Knuth et al, "Fast Virtual Machine Resume for Agile Cloud Services", 2013 IEEE Third International Conference on Cloud and Green Computing, pp. 127-134 (Year: 2013).*
(Continued)

*Primary Examiner* — Charles M Swift
(74) *Attorney, Agent, or Firm* — Patterson + Sheridan, LLP (57) ABSTRACT

Computer program products and a system for managing processing resource usage at a workload manager and an application are described. The workload manager and application may utilize safe stop points to reduce processing resource usage during high cost processing periods while preventing contention in the processing resources. The workload manager and application may also implement lazy resumes or processing resource utilization at the application to allow for continued reduced usage of the processing resources.

18 Claims, 9 Drawing Sheets

(52) U.S. Cl.
CPC .......... *G06F 9/5077* (2013.01); *G06F 9/5083* (2013.01); *G06F 9/5088* (2013.01); *H04L 67/10* (2013.01)

(56) References Cited

U.S. PATENT DOCUMENTS

| | | | | |
|---|---|---|---|---|
| 2009/0049451 | A1* | 2/2009 | Bates | G06F 9/461 718/108 |
| 2009/0150891 | A1* | 6/2009 | Matsa | G06F 9/4881 718/103 |
| 2010/0153341 | A1* | 6/2010 | Driesen | G06F 16/214 707/661 |
| 2010/0229179 | A1* | 9/2010 | Moore | G06F 9/4881 718/104 |
| 2011/0145545 | A1* | 6/2011 | Hunter | G06F 9/4856 712/30 |
| 2013/0124807 | A1* | 5/2013 | Nielsen | G06F 11/1438 711/162 |
| 2014/0258446 | A1* | 9/2014 | Bursell | G06F 15/177 709/217 |
| 2014/0282529 | A1* | 9/2014 | Bugenhagen | G06F 9/45533 718/1 |
| 2014/0310709 | A1* | 10/2014 | Nirantar | G06F 9/485 718/1 |
| 2014/0366019 | A1* | 12/2014 | Bajaj | G06F 9/45558 718/1 |
| 2015/0254108 | A1* | 9/2015 | Kurtzman | G06F 9/5016 718/104 |
| 2017/0206463 | A1 | 7/2017 | Arndt et al. | |
| 2018/0365072 | A1* | 12/2018 | Li | G06F 9/5038 |

OTHER PUBLICATIONS

Ranganathan, P.; "General-Purpose Architectures for Media Processing and Database Applications"; Thesis, Doctor or Philosophy, Rice University; Aug. 2000.
Johnson, FR. et al.; "Decoupling Contention Management from Scheduling"; ASPLOS '10, Mar. 13-17, 2010.
Anonymously; "A Method to Improve Virtual Machine Run-time Performance in Cloud via Dynamic CPU Process Extend"; <http://ip.com/IPCOM/000233552D>; Dec. 12, 2011.
IBM; "Zero-Overhead Contention-lee SIIP Stack Leveraging Programmable RNIC"; <http://ip.com/IPCOM/000167567D>; Feb. 20, 2008.
IBM; "Methods for Measuring the CPU Overhead of a Transaction Oriented Monitoring Tool"; <http://ip.com/IPCOM/000133268D>; Jan. 19, 2006.

* cited by examiner

INTELLIGENT CONTENTIONLESS PROCESSING RESOURCE REDUCTION IN A MULTIPROCESSING SYSTEM

BACKGROUND

The present disclosure relates to reducing usage of processing resources, and more specifically, to reducing processing resource utilization without causing contention in the processing resources.

In current computing environments, it is sometimes desirable or necessary to cap the amount of CPU resources used by applications and utilities executing in the computing environment. In some cases, limiting the CPU used by an application or task occurs even when sufficient CPU capacity is available. This deliberate limiting may be done to lower the billing/accounting cost of using the CPU resources. For example, the cost of the CPU resources may change according to the time of day or day of the week. Applications and utilities using database systems and analytics engines that run on multiprocessing hardware that have other workloads or task executing usually comprise a priority based system, goal mode workload manager, and/or a dispatcher. When a system instituting the CPU usage limits are designed and implemented, certain workloads are only allowed a certain amount of CPU resource usage through timeslicing. These time slices can cause an application task to be interrupted at an inconvenient time. This inconvenient time may cause a low priority application to go to sleep holding a major system resource. If the low priority job has met the CPU limit for this cycle (e.g., a soft cap) and is unable to release the resource, the system can go into contention and prevent further processing. In some cases, system resources are not held for very long (i.e., until the end of the time slice) and so the contention introduces inconvenient pauses, which in turn increases the CPU usage when a workload manager and/or the processing resources attempt to resolve the contention.

SUMMARY

According to one embodiment described herein, a computer program product for managing processing resource usage at a workload manager is provided. The computer program product may include a computer-readable storage medium having computer-readable program code embodied therewith, the computer-readable program code executable by one or more computer processors to perform an operation. The operation may include: receiving, at the workload manager, a task request for processing resources for an application task from an application, providing processing resource access to the application task, determining a current processing resource utilization of the application task request, comparing the current processing resource utilization to a processing resource utilization threshold. The operation may also include when the current processing resource utilization is at or above a processing resource utilization threshold, generating a voluntary suspend notification, where the voluntary suspend notification causes the application to process the application task to a safe stop point and transmitting the voluntary suspend notification to the application.

According to one embodiment described herein, a computer program product for managing processing resource usage at an application is provided. The computer program product may include a computer-readable storage medium having computer-readable program code embodied therewith, the computer-readable program code executable by one or more computer processors to perform an operation. The operation may include: transmitting, at the application, a task request for processing resources for an application task to a workload manager, utilizing processing resources for the application task, and receiving a voluntary suspend notification from a workload manager. The operation may also include determining a safe stop point for the application task and ceasing utilization of the processing resources at the safe stop point.

According to another embodiment described herein, system for managing processing resource usage is provided. The system may include processing resources, a workload manager, an application, one or more computer processors, and a memory containing a program which when executed by the one or more computer processors performs an operation. The operation may include transmitting, at the application, a task request for processing resources for an application task to the workload manager, receiving, at the workload manager, the task request for processing resources for an application task from the application, providing, at the workload manager, processing resource access to the application task. The operation may further include utilizing, at the application, processing resources for the application task, determining, at the workload manager, a current processing resource utilization of the application task request, and comparing, at the workload manager, the current processing resource utilization to a processing resource utilization threshold. The operation may also include when the current processing resource utilization is at or above a processing resource utilization threshold, generating, at the workload manager, a voluntary suspend notification, where the voluntary suspend notification causes the application to process the application task to a safe stop point, transmitting, at the workload manager, the voluntary suspend notification to the application, and receiving, at the application, a voluntary suspend notification from a workload manager. The operation may also include determining a safe stop point for the application task and ceasing utilization of the processing resources at the safe stop point.

DETAILED DESCRIPTION

As described herein, providing communication between a workload manager and an application task being managed by the workload manager allows for CPU resource (processing resource) usage reduction without causing additional contention in the processing resources, (e.g., the CPU). As more and more services move the execution of various applications and tasks to distributed environments such as cloud based computing environments, managing CPU resource usage across various time and utilization periods, such as moving resource usage to less costly times for using the resources. In some examples, cloud providers provide tiered levels of CPU usage costs. For example, CPU usage during high demand periods costs a user more than CPU usage during low demand period. This arrangement encourages users to move their usage of the processing resources to a time of day for processing when CPU usage is cheaper. This is especially true for low priority application tasks that are not time sensitive. Moving these application tasks to cheaper time periods is usually accomplished by methods such as timeslicing and soft capping. These and other previous solutions attempt to address the CPU usages and contention issues caused by CPU management, but ultimately only reduce the amount and/or duration of contention without avoiding the contention.

The workload manager/dispatcher described herein signals the an application with an executing task when it is reaching a certain threshold (e.g., 95%) of a CPU cap (processing resources cap) and also signals an amount of required resume delay after a wake up call to meet the CPU cost goal and further reduce the usages of the processing resources. In response, the application task will proceed until a convenient point is reached in the processing (i.e., when no critical latches/resources are held). Once this point is reached the application task will go into a voluntary suspend. This voluntary suspend also includes a delayed or lazy resume where the task will voluntarily delay the resumption of the application task to achieve the goal of lower CPU usage costs. This has the desired effect of reducing the CPU usage to a desired level (and lowering processing costs) without introducing additional contention that wastes CPU resources. The application task will be allowed to wake up once the next time slice of the CPU is available albeit with a lazy resume. When CPU resources are available, the lazy resume will still slow down and reduce the CPU utilization in the time it is in effect. This allows for time of use based CPU reduction without introducing contention overhead caused by traditional methods such as timeslicing and soft capping.

Figure 1:
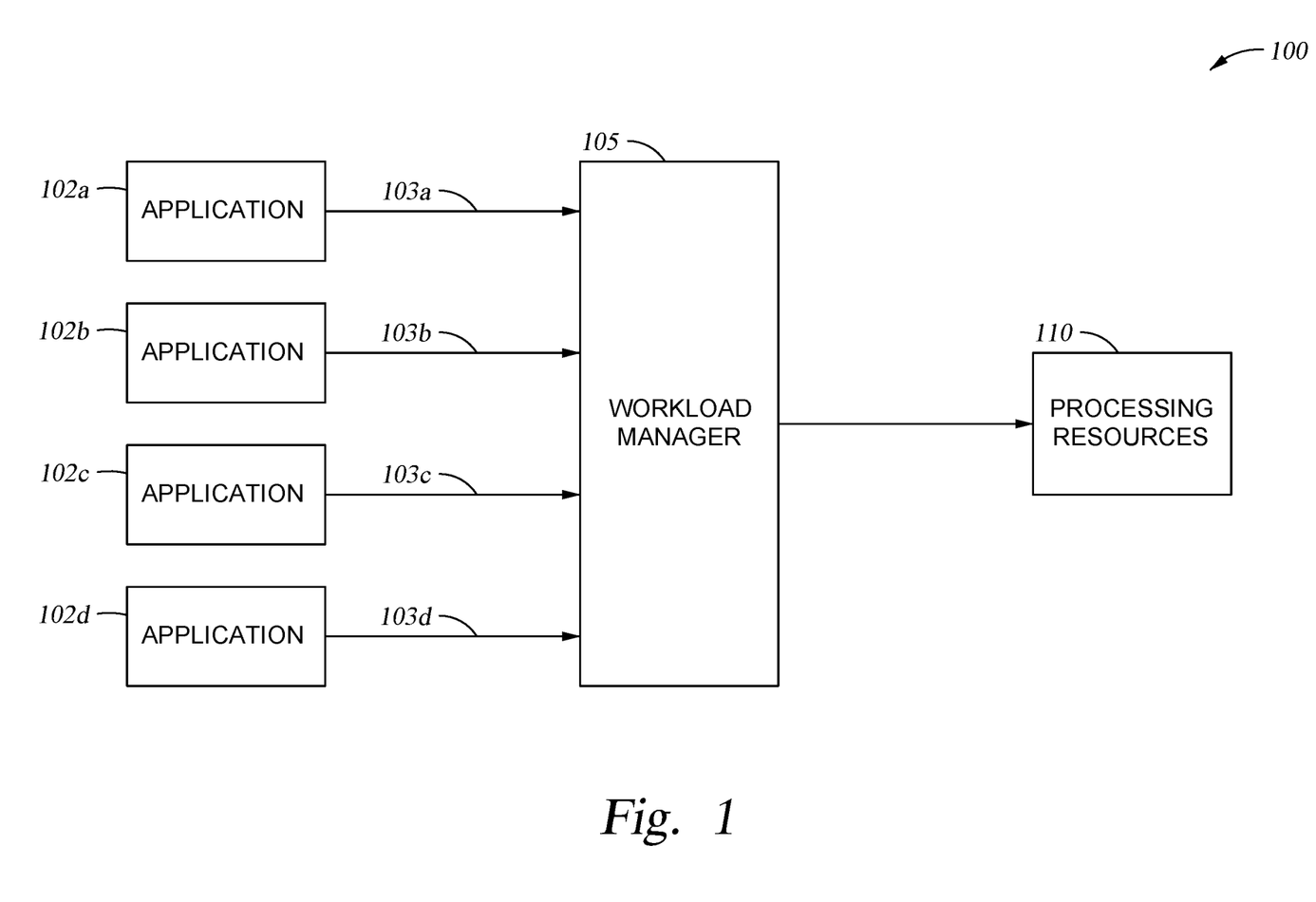
FIG. 1 depicts a processing resources system, according to one embodiment.

FIG. 1 depicts a processing resources system, according to one embodiment. As shown in one example embodiment, system 100 includes applications 102a-102d which are communicatively connected to a workload manager 105 via connections 103a-103d. The workload manager 105 manages the workflow and application tasks sent to and executed by processing resources 110. In some embodiments, the applications 102a-102d, the workload manager 105, and the processing resources 110 are part of a cloud computing environment, such as a cloud based database. For example, a batch data processing application may be configured to process large amounts of data using the processing resources. In another example, some applications, such as an automatic teller machine (ATM) may consist of real time data processing using the processing resources. The applications 102a-102d may comprise distributed applications, database applications, and/or utilities executing on a database or cloud based network among other possible tasks. As illustrated in FIG. 1, the workload manager 105 may be situated such that the applications 102a-102d access the processing resources 110 through the workload manager 105. In another embodiment, the applications 102a-102d may access the processing resources 110 directly according to instructions from the workload manager 105.

In one example embodiment, the workload manager 105 receives a task request for processing resources for an application task from an application, such as the application 102a via the connection 103a and provides the processing resources 110 to the application task executing at the application 102a. Workload manager 105 may provide the resource by transmitting a wake up signal and/or notification to the application during a determined time slice. The workload manager 105 also determines if the application task has met its utilization cap for a specific time period. For example, workload manager 105 including a program module executing on workload manager 105, may compare a current processing resources utilization for a period of time to a processing resource utilization threshold.

Figure 2A:
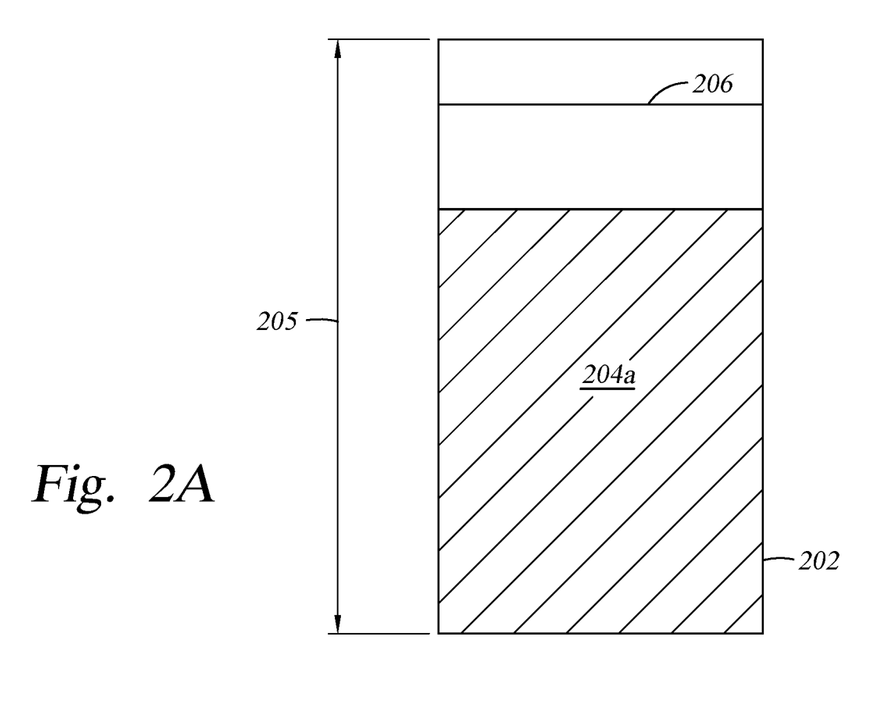
FIGS. 2A and 2B illustrate processing resource utilization, according to example embodiments.
Figure 2B:
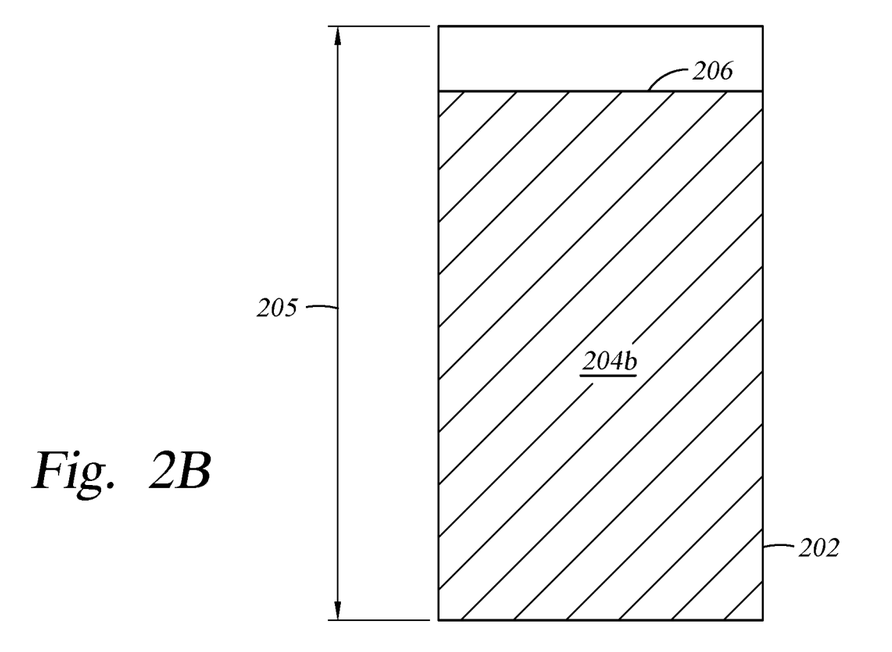

For example, as shown in FIGS. 2A and 2B, which illustrate processing resource utilization, according to example embodiments, the current utilization threshold may comprise current processing resource utilization 204a and 204b. In FIG. 2A, the processing resource utilization is below the processing resource utilization threshold 206 and processing resource utilization cap 205. In contrast, in FIG. 2B, the processing resource utilization 206b has met or is equal to the processing resource utilization threshold 206. As shown in FIGS. 2A and 2B, the processing resource utilization threshold 206 may be below the processing resource utilization cap 205. In some examples, FIGS. 2A and 2B occur within in the same time period with FIG. 2B occurring later than FIG. 2A after an application task utilizes the processing resources. Once the workload manager 105 determines that the current processing resource utilization is at or above the processing resource utilization threshold 206, a voluntary suspend is sent to the application. Having the workload manager 105 transmit the voluntary suspend and the application's response to the voluntary suspend, allows for the processing resources to not be locked and to reduce contention in the processing resources prior to the processing resource utilization cap 205 being met. In some examples, the processing resource utilization cap 205 may be set at first value for a low priority application task and a second higher value for a high priority application task. This allows for conservation of processing resources for lower priority tasks while allowing high priority tasks to continue utilization of the processing resources.

Figure 3A:
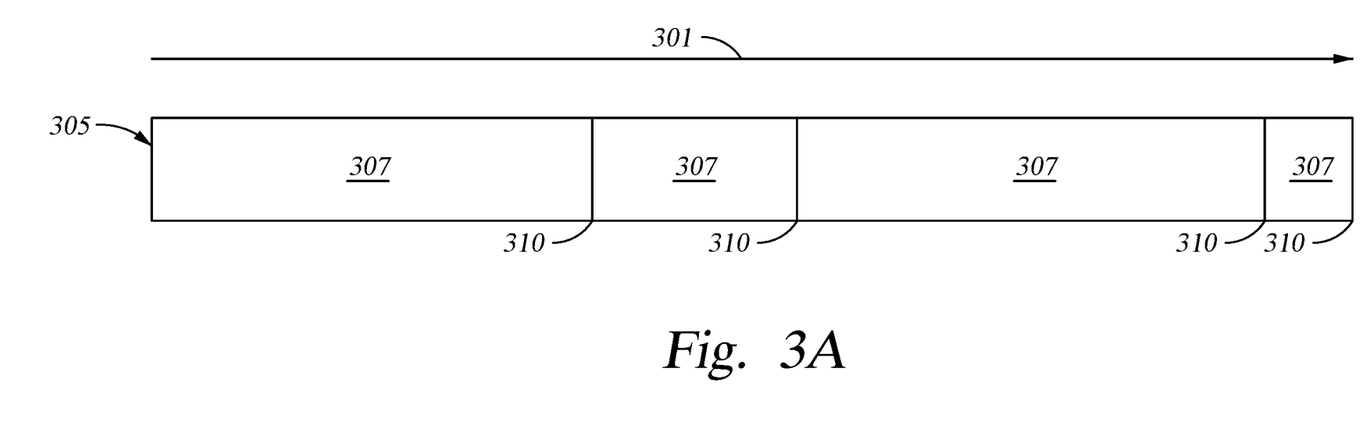
FIG. 3A illustrates an application task, according to one embodiment.

In some examples, the workload manager 105 will transmit the voluntary suspend to an application, such as application 102a. The application 102a will then continue processing or executing the application task using the processing resource until a safe stop point is reached. For example, as shown in FIG. 3A, which illustrates an application task, according to one embodiment, the application task 305 may proceed, according to time 301, to a safe stop point 310. During processes 307, the application task 305 may hold critical latches or otherwise lock the processing resources 110, such that if the application task stopped during this period, the processing resources 110 would be held by the application task 305. For example, latches of internal control block chains of the processing resources should be released at the safe stop in order to avoid contention. This is in contrast to a stop point that would release the latches at an arbitrary point, thus causing contention. At the safe stop points 310, the application task 305 is not holding critical resources (e.g., critical lock and/or latches of the processing resource) and/or the processing resources 110 are not locked, such that suspending the application task 305 at the safe stop points 310 does not hold the processing resources 110 and does not introduce contention.

Figure 3B:
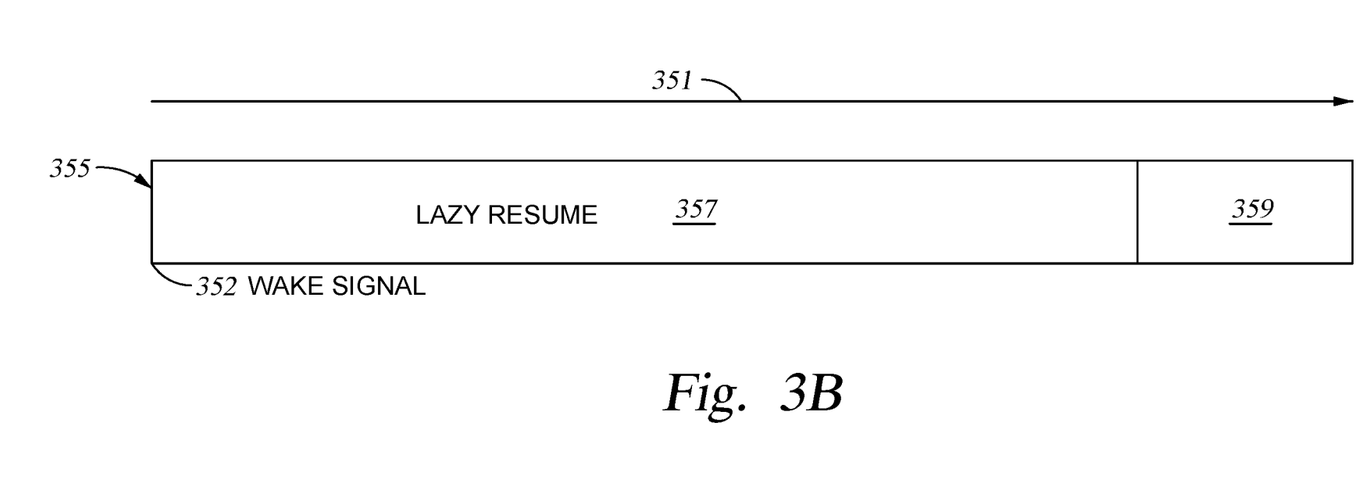
FIG. 3B illustrates an application task with a lazy resume, according to one embodiment.

In some embodiments, the workload manager 105 will also transmit a lazy resume notification to an application, such as application 102a. The application will then resume according to the lazy resume once it receives a wake signal and as time 351 proceeds. For example, as shown in FIG. 3B, which illustrates an application task with a lazy resume, according to one embodiment, the application task 355 may delay resuming utilization of the processing resources 110 even after a wake signal 352 is received at the application 102a, according to the lazy resume 357. This allows for an application to reduce the usage of the processing resources 110 even if the workload manager has signaled or provided the processing resources to the application for use. For example, instead of utilizing an entire time slice, the application task 355 only uses processing resource for the processes 359.

Figure 4:
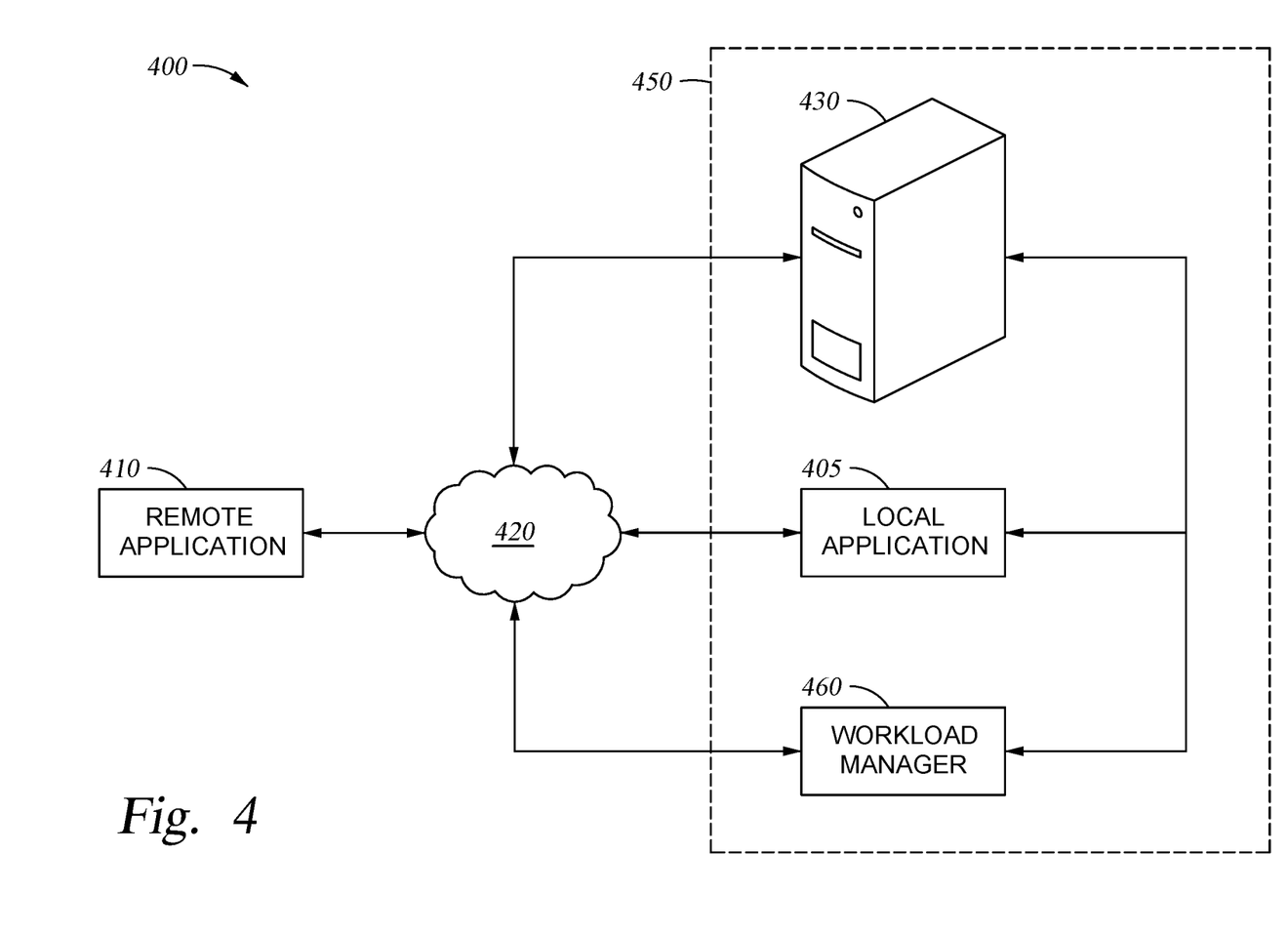
FIG. 4 illustrates an exemplary system to facilitate hardware in a computing infrastructure facility, according to one embodiment.
Figure 5:
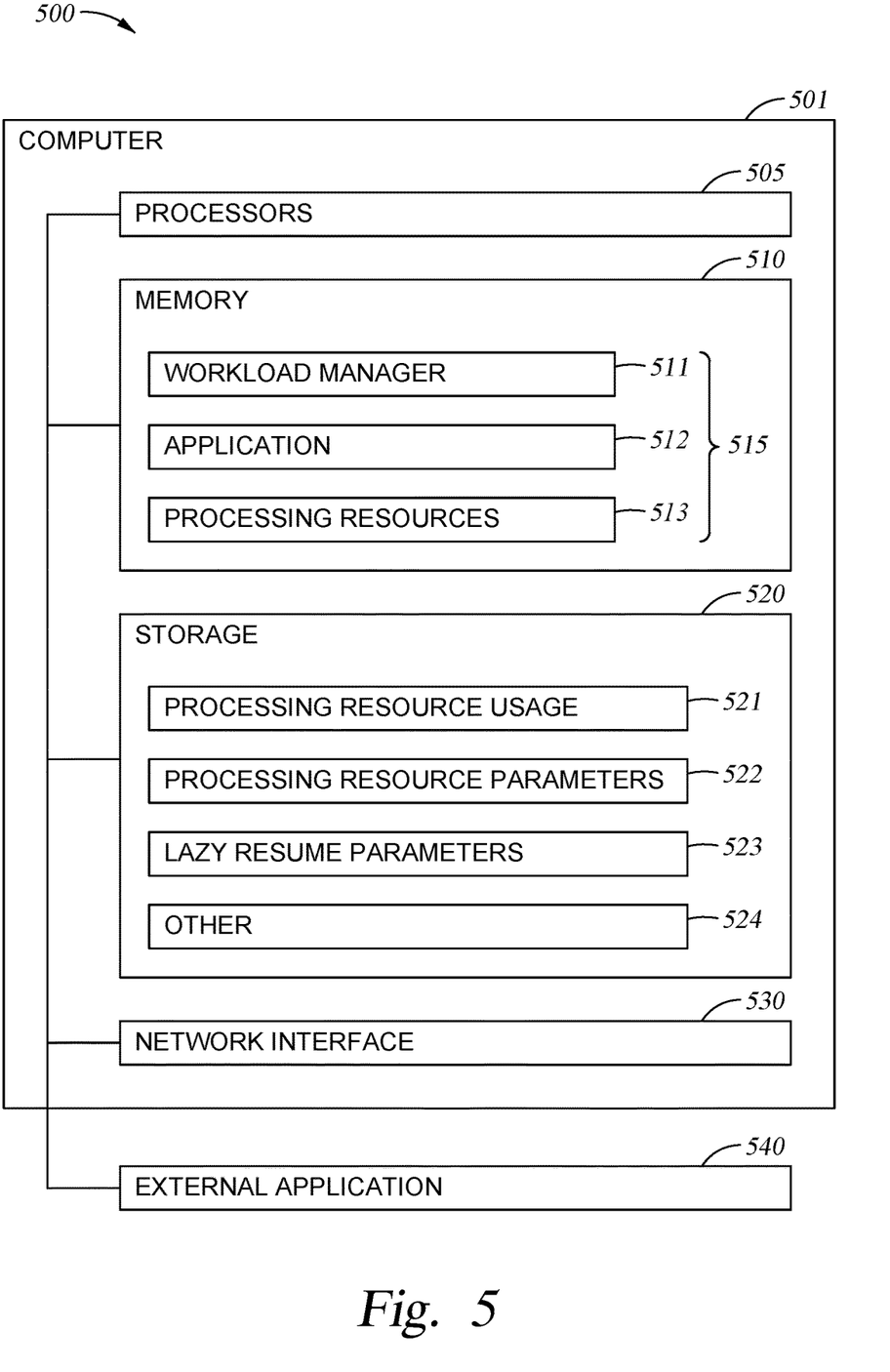
FIG. 5 is a block diagram of a server to facilitate managing processing resource usage, according to one embodiment.

FIG. 4 illustrates an exemplary system 400 for managing processing resource usage, according to one embodiment. As illustrated and shown in FIG. 1 system 400 may include various components of a system 100. The system 400 may comprise a collocated system or may be a distributed system where each component is located remotely from other components and connected via network 420. For example, a server 450 housing processing resources 430 may be located remotely from workload manager 460, remote application 410 and/or local application 405 such as in a cloud computing system. Local application 405 and remote application 410 may comprise applications 102a-102b as shown in FIG. 1. In another example, as shown, the local application 405 and the workload manager 460 may be located on server 450. In one example, system 400 comprises a database system and local application 405 and remote application 410 comprises database system applications and the workload manager 460 is a database system workload manager Server 450 generally includes processor(s), memory, and communications capabilities and is configured to perform various computing tasks to support managing processing resource usage. Network 420 may include one or more networks of various types, including a local area or local access network (LAN), a general wide area network (WAN), and/or a public network (e.g., the Internet). In one embodiment, various networked computing devices of the system 400 are interconnected using a LAN, WAN, and/or one or more computing devices (e.g., server 450, etc.) including connections to the Internet FIG. 5 is a block diagram of a server, such as server 450, for managing processing resource usage, according to one embodiment. As shown in FIG. 5, the arrangement 500 may include the server 450 embodied as computer 501 configured to execute the function of the system 100. The computer 501 is shown in the form of a general-purpose computing device. The components of computer 501 may include, but are not limited to, one or more processors or processing units 505, a system memory 510, a storage system 520, network interface 530, and a bus 550 that couples various system components including the system memory 510 and storage system 520 to processors 505 along with various input/output components. In other embodiments, arrangement 500 is distributed and includes a plurality of discrete computing devices that are connected through wired or wireless networking.

Bus 550 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 501 typically includes a variety of computer system readable media. Such media may be any available media that is accessible by computer 501, and it includes both volatile and non-volatile media, removable and non-removable media.

System memory 510 can include computer system readable media in the form of volatile memory, such as random access memory (RAM) and/or cache memory. Computer 501 may further include other removable/non-removable, volatile/non-volatile computer system storage media. By way of example, storage system 520 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 550 by one or more data media interfaces. As will be further depicted and described below, memory 510 may include at least one program product having a set (e.g., at least one) of program modules that are configured to carry out the functions of embodiments of the invention.

Computer 501 may further include other removable/non-removable, volatile/non-volatile computer system storage media. In some examples, storage system 520 may be included as part of memory 510 and may typically provide a non-volatile memory for the networked computing devices, and may include one or more different storage elements such as Flash memory, a hard disk drive, a solid state drive, an optical storage device, and/or a magnetic storage device. For example, storage system 520 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 550 by one or more data media interfaces. Storage 520 may include media for storing processing resource usage 521, processing resource parameters 522, and lazy resume parameters 523. Storage system 520 may also include other information 524 stored for access and use by the computer 501.

Memory 510 may include a plurality of modules 515 for performing various functions described herein. The modules 515 generally include program code that is executable by one or more of the processors 505. As shown, modules 515 include workload manager module 511, application module 512, and processing resources module 513.

In one embodiment, the workload manager module 511 receives a task request via connection 103b for processing resources for an application task from an application and provides processing resource access to the application task. For example, the workload manager module 511 embodied as workload manager 105 receives a task request for processing resources 110 for an application task from an application 102b and provides processing resource access to the application task running on application 102*b*. The workload manager module 511 may also interact with processing resources module 513 which determines a current processing resource utilization of the application task request and compares the current processing resource utilization to a processing resource utilization threshold. For example, the processing resources module 513 may determine a current processing resource usage and store it as processing resource usage 521. In some examples, the processing resource usage 521 may include usage of the processing resources from a prior resource utilization period. For example, if application 102*b* has utilized the processing resources 110 during a high cost time period the processing resource usage may include the previous utilization along with utilization during the current usage.

The workload manager module 511 when the current processing resource utilization is at or above a processing resource utilization threshold as determined by processing resources module 513, also generates a voluntary suspend notification, where the voluntary suspend notification causes the application to process the application task to a safe stop point and transmitting the voluntary suspend notification to the application. For example, the workload manager module 511 may transmit a voluntary suspend notification to the application 102*b* where application 102*b* will allow the application task 305 to proceed to a voluntary stop at safe stop point 310, as shown in FIG. 3A.

In one embodiment, the workload manager module 511 also generates a lazy resume notification comprising a lazy resume parameter. In one example, the lazy resume notification causes the application to begin processing a subsequent application task according to the lazy resume parameter. In some examples, the lazy resume parameter may be determined by the processing resources module 513 based on the comparison between the processing resource usage 521 and the processing resource parameters 522. In some examples, the lazy resume may be calculated according to a user defined parameter which indicates the importance of the application task. For example, for a low priority task, the lazy resume may be long so that the workload is slowed and the processing resources conserved for the low priority task. In contrast, the user defined parameter for a high priority task may include a shorter lazy resume in order to continue the processing of the high priority application task. The processing resources module 513 may utilize lazy resume parameters 523 to determine an appropriate lazy resume for the application task in order to conserve or reduce processing resource usage. For example, the generated lazy resume notification may include a lazy resume parameter to cause application 102*b* to delay resumption of the application task for a certain period of time, such as lazy resume 357 shown in FIG. 3B.

The workload manager module 511 may then transmit the lazy resume notification to the application and when a time slice for the application task is available, transmit a task resume notification to the application. In some examples, the workload manager module 511 may transmit the lazy resume notification as part of and/or concurrent with the voluntary suspend notification. Furthermore, when the workload manager module 511 determines that the scheduled time slice for the application task at application 102*b* to utilize the processing resources is available the workload manager module 511 may transmit a wake signal/task resume notification to the application 102*b*, such as wake signal 352.

The workload manager module 511 may also determine that a processing resource cycle has finished. For example, after a high CPU cost time period is over the workload manager module 511 may determine that the processing resource cycle has finished. The workload manager module 511 may then reset the current processing resource utilization. For example, the workload manager module 511 may reset the current processing resource utilization stored in processing resource usage 521. In one example, the workload manager module 511 then transmits a processing resources reset notification to the application. The processing resources reset notification will inform the application to cease utilizing a lazy resume.

The program module 515 also includes application module 512 which may be configured to execute the processes of an application (e.g., applications 102*a*-102, remote application 410, and/or local application 405). In another example embodiment, the application module 512 may be located on the same memory 510 as the workload manager module 511 and the processing resources module 513, (i.e. collocated on server 450/computer 501). In another example, the application module 512 may be located and executed on another computing device similar to computer 501. In this example, the application module 512 may be connected to the computer 501 as external application 540. In some examples, the external application is connected to computer 501 through bus 550. In another example, the external application 540 may be connected to computer 501 through an external network (e.g., network 420) and network interface 530.

Furthermore, in some examples, the application module 512 transmits a task request for processing resources for an application task to a workload manager. For example, the application module 512 embodied as application 102*c* may transmit a task request for a task such as any application process that uses processing resources 110. Once the workload manager module 511 grants access to the processing resources to the application module 512, the application module 512 utilizes processing resources for the application task. For example, application 102*c* utilizes processing resources 110 for an application task running on the application.

The application module 512 also receives a voluntary suspend notification from a workload manager and determines a safe stop point for the application task. For example, when workload manager module 511 transmits a voluntary suspend notification to the application module (e.g., application 102*c*), the application module 112 determines a safe stop point, such as safe stop point 310 as shown in FIG. 3A. As described herein, the safe stop point may comprise a processing point in the application task wherein the processing resources are not locked by the application task. The application module 112 then ceases utilization of the processing resources 110 at one of the determined safe stop points 310. This allows for the processing resources to be conserved without creating contention in the processing resources 110.

In some examples, the application module 512 also receives a lazy resume notification comprising a lazy resume parameter and determines a delay for utilizing processing resources according to the lazy resume parameter. For example, the workload manager module 511 may transmit a lazy resume parameter as part, of lazy resume notification, where the lazy resume parameter is determined to conserve the processing resources. The application module may then determine from the lazy resume parameter an appropriate lazy resume, such as lazy resume 357. The application module 512 may then receive a task resume notification from the workload manager such as wake signal 352 and delay utilization of the processing resources for the application task according to the determined delay. In some examples, to continue preserving the processing resource 110, application module 512 delays resumption of the processing resource for the application task according to the determined delay for one or more subsequent received task resume notifications. For example, even for subsequent time slices where the workload manager module 511 transmits wake up signals to the application 102c, the application 102c will delay using the processing resources 110 according to lazy resume 357.

In another example, the lazy resume 357 may also be updated (either shortened or lengthened) by subsequent lazy resume notifications received from workload manager module 511. In one example, the application module 512, receives a processing resources reset notification and resumes a default resource utilization of the processing resources for the application task. For example, after an expensive processing time period has passed, the workload manager module 511 transmits a processing resource reset notification to the applications operating with a lazy resume, such as application 102c. In turn, the application 102c then resumes normal utilization of the processing resources 110 when access is granted to application 102c. In some examples, this allows the application 102c to complete low priority tasks that have been delayed from the high cost time period to be completed during the low cost time period.

Computer 501 may also communicate with one or more external devices such as a keyboard, a pointing device, a display, etc.; and one or more devices that enable a user to such as interact with computer 501; and/or any devices (e.g., network card, modem, etc.) that enable computer 501 to communicate with one or more other computing devices. Additionally, computer 501 may communicate with one or more networks such as a local area network (LAN), a general wide area network (WAN), and/or a public network (e.g., the Internet) via network interface 530. Computer 501 may also communicate with remote application 410 through external application interface 540 and/or network interface 530. As depicted, network interface 530 communicates with the other components of computer 501 via bus 550. It should be understood that although not shown, other hardware and/or software components could be used in conjunction with computer 501. Examples include, but are not limited to: cloud computing systems, microcode, device drivers, redundant processing units, external disk drive arrays, RAID systems, tape drives, and data archival storage systems, etc.

Figure 6:
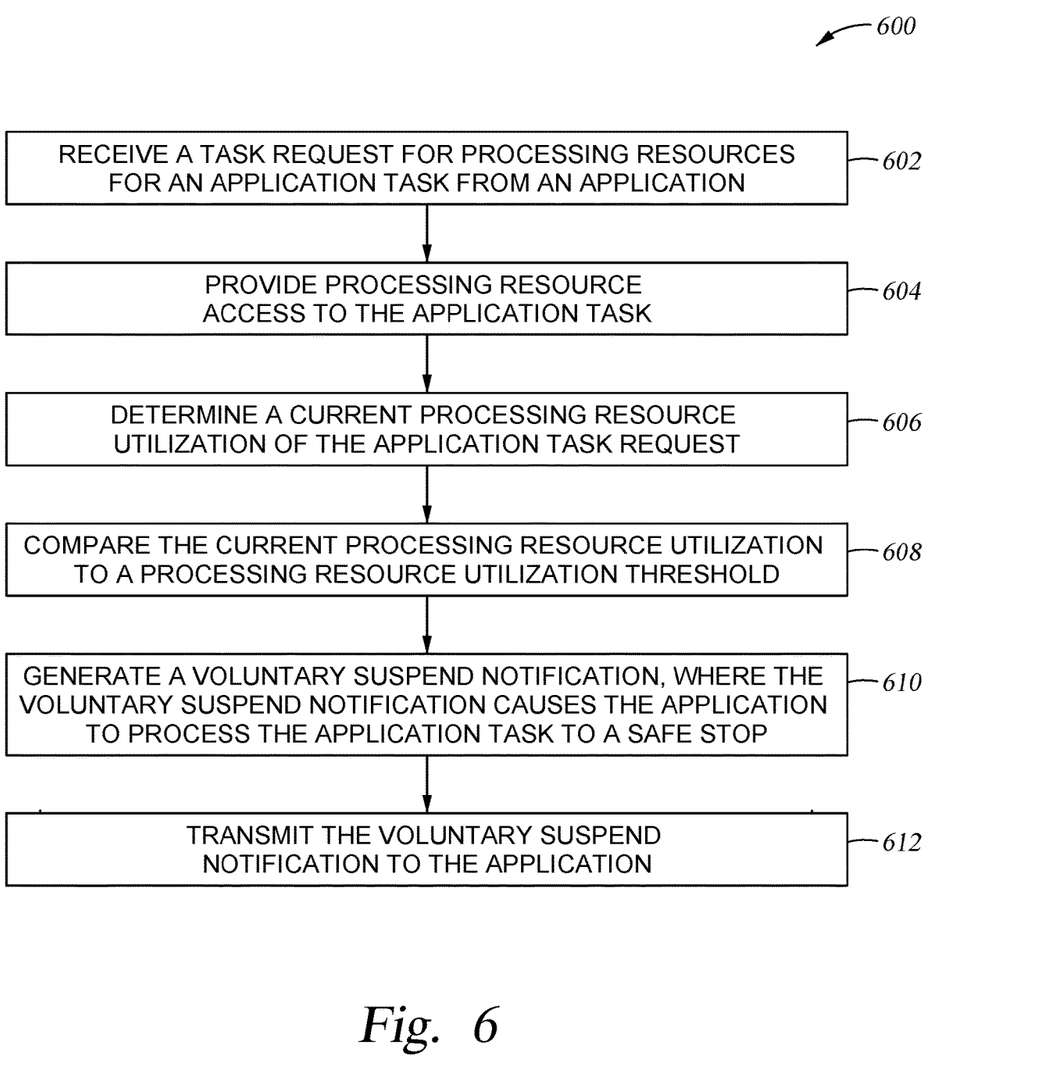
FIGS. 6-8 illustrate methods to manage processing resource usage at a workload manager, according to example embodiments.

FIG. 6 illustrates a method to manage processing resource usage at a workload manager, according to example embodiments. Method 600 begins at block 602 where a computer 501 using workload manager module 511, receives a task request for processing resources for an application task from an application and provides processing resource access to the application task at block 604. Method 600 continues at block 606 where computer 501 using processing resources module 513, determines a current processing resource utilization of the application task request and compares the current processing resource utilization to a processing resource utilization threshold at block 608. Method 600 then continues at blocks 610 and 612 where a computer 501 using workload manager module 511, when the current processing resource utilization is at or above a processing resource utilization threshold, generates a voluntary suspend notification, where the voluntary suspend notification causes the application to process the application task to a safe stop point and transmits the voluntary suspend notification to the application.

Figure 7:
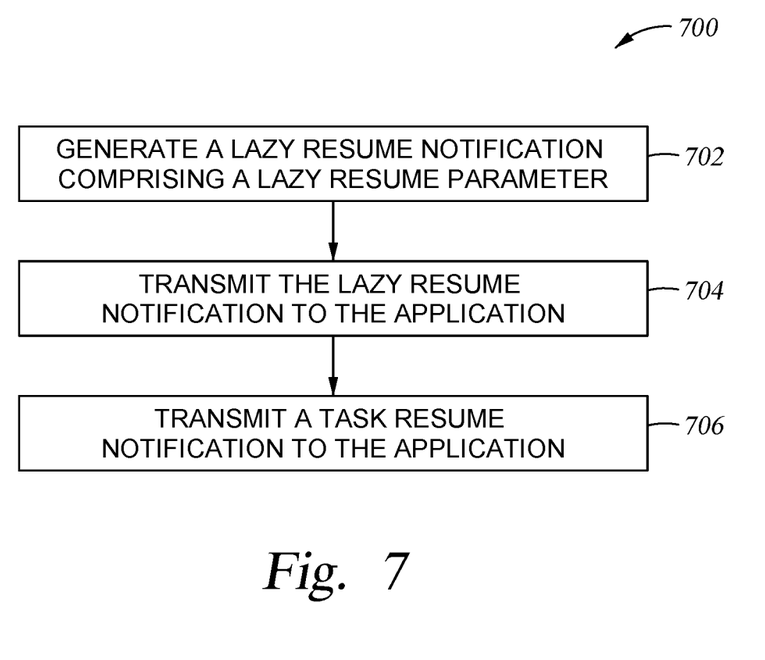

FIG. 7 illustrates an additional method to manage processing resource usage at a workload manager, according to example embodiments. Method 700 begins at block 702 where a computer 501 using workload manager module 511, generates a lazy resume notification comprising a lazy resume parameter, wherein the lazy resume notification causes the application to begin processing a subsequent application task according to the lazy resume parameter and transmits the lazy resume notification to the application at block 704. Method 700 continues at block 706 where computer 501 using workload manager module 511, when a time slice for the application task is available, transmits a task resume notification to the application.

Figure 8:
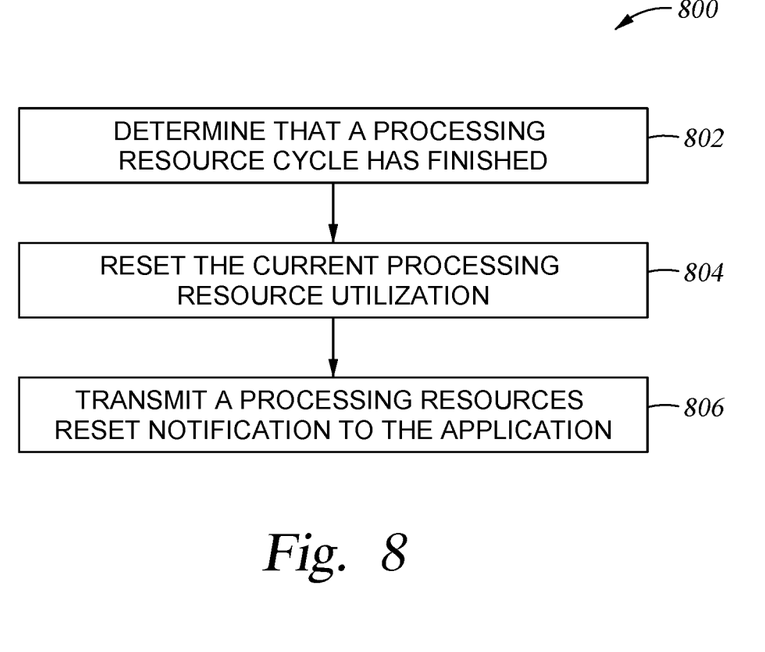

FIG. 8 illustrates an additional method to manage processing resource usage at a workload manager, according to example embodiments. Method 800 begins at block 802 where a computer 501 using workload manager module 511, determines that a processing resource cycle, such as a high cost time period for processing resources has finished and resets the current processing resource utilization at block 704. For example, the processing resource usage 521 may be reset by the workload manager module 511. Method 800 continues at block 806 where computer 501 using workload manager module 511, transmits a processing resources reset notification to the application. In some examples, this informs the application that it may utilize the processing resources normally.

Figure 9:
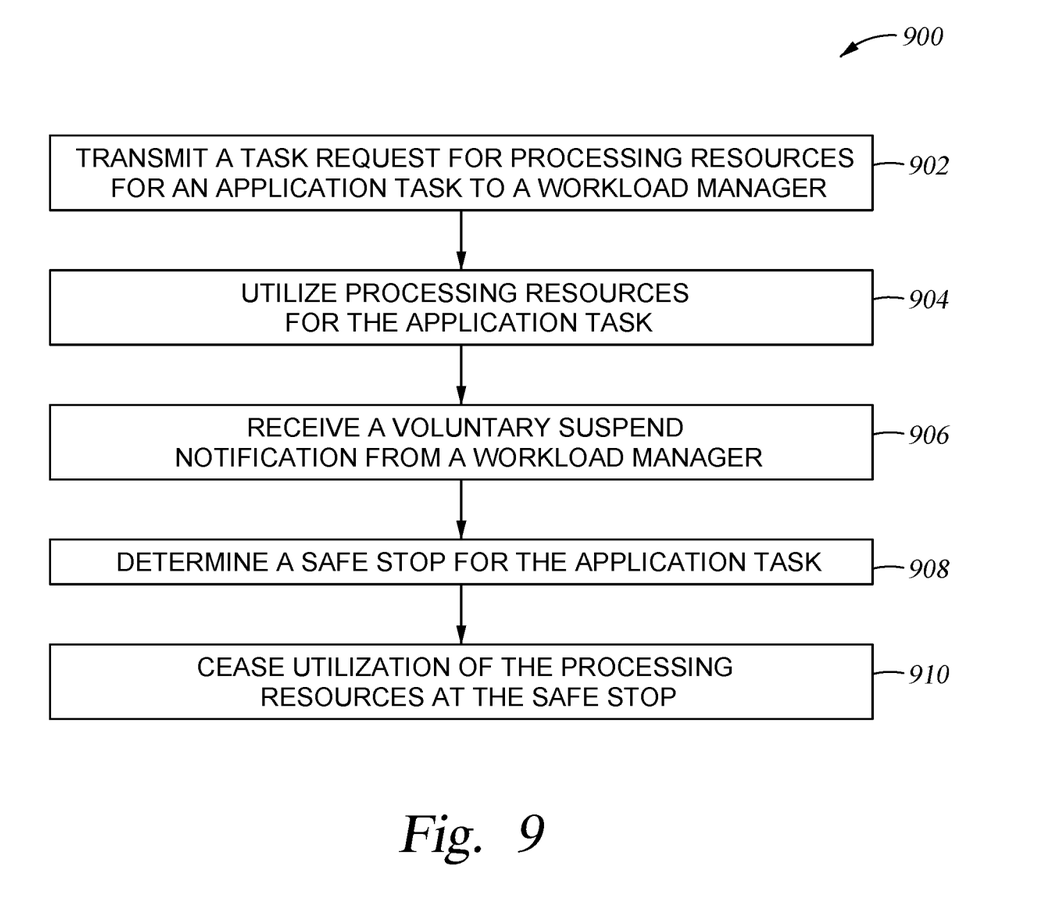
FIGS. 9-11 illustrate methods to manage processing resource usage at an application, according to example embodiments.

FIG. 9 illustrates a method to manage processing resource usage at an application, according to an example embodiment. Method 900 begins at block 902 where a computer 501 using application module 512, transmits a task request for processing resources for an application task to a workload manager. After the application module 512 receives permission or access to utilize the processing resources from a workload manager, such as workload manager module 511, the method 900 where the computer 501 using application module 512 utilizes processing resources for the application task at block 904. Method 900 continues at block 906 where computer 501 using application module 512 receives a voluntary suspend notification from a workload manager and determines a safe stop point for the application task, such as safe stop point 310 shown in FIG. 3. Method 900 then continues to block 910 where computer 501, using application module 512, ceases utilization of the processing resources at the safe stop point.

Figure 10:
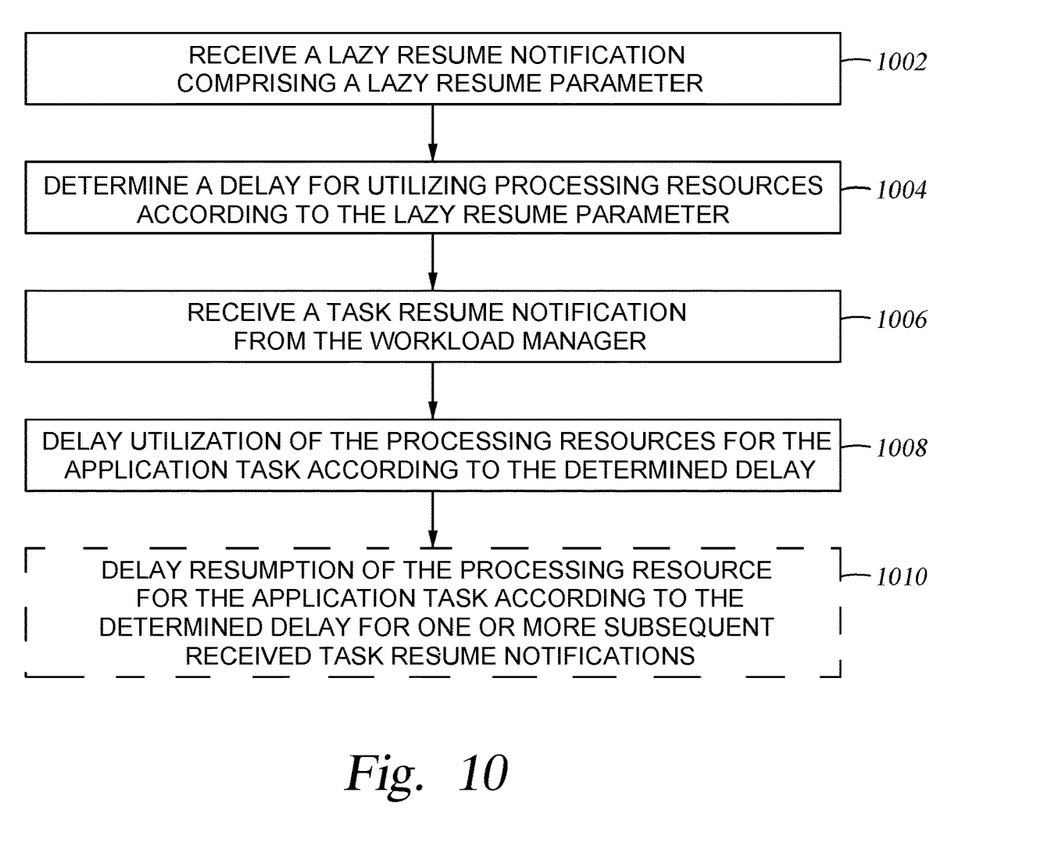
Figure 11:
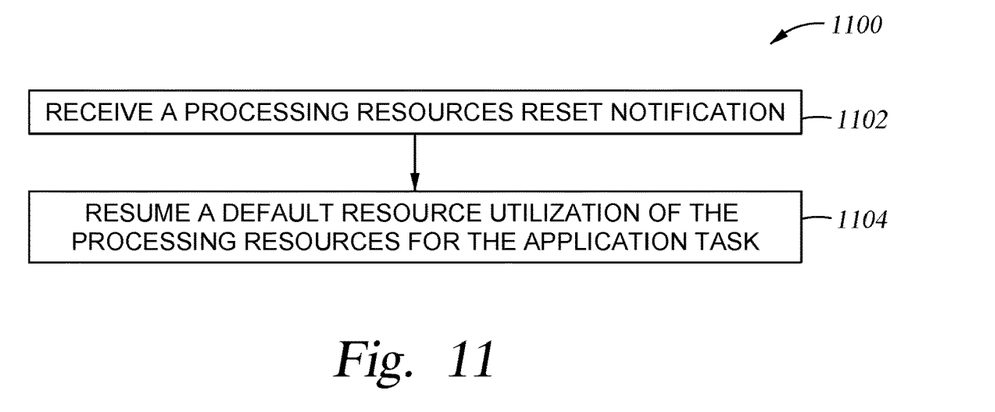

FIG. 10 illustrates an additional method to manage processing resource usage at an application, according to an example embodiment. Method 1000 begins at block 1002 where a computer 501 using application module 512, receives a lazy resume notification comprising a lazy resume parameter. Method 1000 continues at block 1004 where the computer 501, using application module 512 determines a delay for utilizing processing resources according to the lazy resume parameter. Method 1000 continues at block 1006 where computer 501 using application module 512 receives a task resume notification from the workload manager and delays utilization of the processing resources for the application task according to the determined delay at block 1008. In some example embodiments, method 1000 then continues to block 1010 where computer 501, using application module 512, delays resumption of the processing resource for the application task according to the determined delay for one or more subsequent received task resume notifications. For example, the application module 512 may utilize the lazy resume until instructed to return normal utilization of the processing resources by a workload manager. For example, as shown in FIG. 11, which illustrates an additional method to manage processing resource usage at an application, according to an example embodiment, a computer 501 using application module 512, receives a processing resources reset notification at block 1102 and resumes a default resource utilization of the processing resources for the application task at block 1104.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., program modules 515) or related data available in the cloud. For example, the workload manager module 511 and processing resources module 513 could execute on a computing system in the cloud and manage the usage of processing resources for one or more applications also executing in the cloud. In such a case, the workload manager module 511 and processing resources module 513 may access and store processing resource usage 521 and other parameters at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer program product for managing processing resource usage at a workload manager, the computer program product comprising:
   a computer-readable storage medium having computer-readable program code embodied therewith, the computer-readable program code executable by one or more computer processors to perform an operation that includes:
   receiving, at the workload manager, a task request for processing resources for an application task from an application;
   providing processing resource access to the application task;
   determining a current processing resource utilization of the application task;
   comparing the current processing resource utilization to a processing resource utilization threshold, wherein the processing resource utilization threshold is below a processing resource utilization cap for the application task;
   when the current processing resource utilization is at or above the processing resource utilization threshold, generating a voluntary suspend notification, where the voluntary suspend notification causes the application to process the application task to a safe stop point where the application task does not cause contention in the processing resources and wherein the application task processes to the safe stop point prior to reaching the processing resource utilization cap for the application task;
   transmitting the voluntary suspend notification to the application;
   generating a lazy resume notification comprising a lazy resume parameter, wherein the lazy resume notification causes the application to begin processing a subsequent application task according to the lazy resume parameter, wherein the lazy resume parameter reduces an amount of processing resources requested by the application; and
   transmitting the lazy resume notification to the application.

2. The computer program product of claim 1, wherein the operation further includes:
   when a time slice for the application task is available, transmitting a task resume notification to the application.

3. The computer program product of claim 1, wherein the safe stop point is a processing point in the application task wherein the processing resources are not locked by the application task.

4. The computer program product of claim 1, wherein the application comprises a database system application and wherein the workload manager is a database system workload manager.

5. The computer program product of claim 1, wherein the operation further includes:

determining, at the workload manager, that a processing resource cycle has finished;
resetting the current processing resource utilization; and
transmitting a processing resources reset notification to the application.

6. A computer program product for managing processing resource usage at an application, the computer program product comprising:
a computer-readable storage medium having computer-readable program code embodied therewith, the computer-readable program code executable by one or more computer processors to perform an operation that includes:
transmitting, at the application, a task request for processing resources for an application task to a workload manager;
utilizing processing resources for the application task;
receiving a voluntary suspend notification from a workload manager indicating a processing resource utilization threshold has been reached, wherein the processing resource utilization threshold is below a processing resource utilization cap for the application;
determining a safe stop point for the application task, where the application task does not cause contention in the processing resources;
ceasing utilization of the processing resources at the safe stop point and prior to reaching the processing resource utilization cap;
receiving, at the application, a lazy resume notification comprising a lazy resume parameter; and
determining a delay for utilizing processing resources according to the lazy resume parameter, wherein the delay for utilizing processing resources reduces an amount of processing resources requested by the application for a period of time.

7. The computer program product of claim 6, wherein the operation further includes:
receiving a task resume notification from the workload manager; and
delaying utilization of the processing resources for the application task according to the determined delay.

8. The computer program product of claim 7, wherein the operation further includes:
delaying resumption of the processing resources for the application task according to the determined delay for one or more subsequent received task resume notifications.

9. The computer program product of claim 6, wherein the operation further includes:
receiving a processing resources reset notification; and
resuming a default resource utilization of the processing resources for the application task.

10. The computer program product of claim 6, wherein the safe stop point is a processing point in the application task wherein the processing resources are not locked by the application task.

11. The computer program product of claim 6, wherein the application comprises a database system application and wherein the workload manager is a database system workload manager.

12. A system for managing processing resource usage, comprising:
processing resources;
a workload manager;
an application;
one or more computer processors; and
a memory containing a program which when executed by the one or more computer processors performs an operation comprising:
transmitting, at the application, a task request for processing resources for an application task to the workload manager;
receiving, at the workload manager, the task request for processing resources for an application task from the application;
providing, at the workload manager, processing resource access to the application task;
utilizing, at the application, processing resources for the application task
determining, at the workload manager, a current processing resource utilization of the application task;
comparing, at the workload manager, the current processing resource utilization to a processing resource utilization threshold; wherein the processing resource utilization threshold is below a processing resource utilization cap for the application task
when the current processing resource utilization is at or above the processing resource utilization threshold, generating, at the workload manager, a voluntary suspend notification, where the voluntary suspend notification causes the application to process the application task to a safe stop point, where the application task does not cause contention in the processing resources and wherein the application task processes to the safe stop point prior to reaching processing resource utilization cap for the application task;
transmitting, at the workload manager, the voluntary suspend notification to the application;
receiving, at the application, a voluntary suspend notification from a workload manager;
determining a safe stop point for the application task;
ceasing utilization of the processing resources at the safe stop point and prior to reaching the processing resource utilization cap;
generating a lazy resume notification comprising a lazy resume parameter, wherein the lazy resume notification causes the application to begin processing a subsequent application task according to the lazy resume parameter, wherein the lazy resume parameter reduces an amount of processing resources requested by the application; and
transmitting the lazy resume notification to the application.

13. The system of claim 12, wherein the operation further comprises:
receiving, at the application, the lazy resume notification;
determining a delay for utilizing processing resources according to the lazy resume parameter;
when a time slice for the application task is available, transmitting, at the workload manager, a task resume notification to the application
receiving, at the application, a task resume notification from the workload manager; and
delaying, at the application, utilization of the processing resources for the application task according to the determined delay.

14. The system of claim 12, wherein the safe stop point is a processing point in the application task wherein the processing resources are not locked by the application task.

15. The system of claim 12, wherein the system comprises a database system, wherein the application comprises a database system application, and wherein the workload manager is a database system workload manager.

16. The system of claim 12, wherein the operation further comprises:
    delaying, at the application, resumption of the processing resource for the application task according to a determined delay for one or more subsequent received task resume notifications.

17. The system of claim 12, wherein the operation further comprises:
    determining, at the workload manager, that a processing resource cycle has finished;
    resetting, at the workload manager, the current processing resource utilization;
    transmitting, at the workload manager, a processing resources reset notification to the application;
    receiving, at the application, the processing resources reset notification; and
    resuming a default resource utilization of the processing resources for the application task.

18. The system of claim 12, wherein the system comprises a cloud based computing system.

* * * * *